(12) United States Patent
Liu et al.

(10) Patent No.: US 12,191,500 B2
(45) Date of Patent: Jan. 7, 2025

(54) NEGATIVE CURRENT COLLECTOR, NEGATIVE ELECTRODE PLATE, ELECTROCHEMICAL APPARATUS, BATTERY MODULE, BATTERY PACK, AND DEVICE

(71) Applicant: CONTEMPORARY AMPEREX TECHNOLOGY (HONG KONG) LIMITED, Hong Kong (CN)

(72) Inventors: Xin Liu, Ningde (CN); Mingling Li, Ningde (CN); Jia Peng, Ningde (CN); Qisen Huang, Ningde (CN); Chengdu Liang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 896 days.

(21) Appl. No.: 17/112,775

(22) Filed: Dec. 4, 2020

(65) Prior Publication Data

US 2021/0119219 A1    Apr. 22, 2021

Related U.S. Application Data

(63) Continuation of application No. PCT/CN2019/119740, filed on Nov. 20, 2019.

(30) Foreign Application Priority Data

Jul. 1, 2019 (CN) .......................... 201910586045.4

(51) Int. Cl.
*H01M 4/00* (2006.01)
*H01M 4/66* (2006.01)
(Continued)

(52) U.S. Cl.
CPC ............ *H01M 4/667* (2013.01); *H01M 4/661* (2013.01); *H01M 10/0525* (2013.01); *H01M 2004/021* (2013.01); *H01M 2004/027* (2013.01)

(58) Field of Classification Search
CPC ........ H01M 4/667; H01M 4/70; H01M 4/131; H01M 4/668; H01M 10/058; H01M 4/661; H01M 4/525
See application file for complete search history.

(56) References Cited

U.S. PATENT DOCUMENTS

| 9,824,788 B2 | 11/2017 | Kang et al. |
| 2013/0017441 A1* | 1/2013 | Affinito ................. H01M 50/46 429/211 |

(Continued)

FOREIGN PATENT DOCUMENTS

| CN | 102031490 A | 4/2011 |
| CN | 106654285 A | 5/2017 |

(Continued)

OTHER PUBLICATIONS

First Office Action received in the corresponding Chinese Application 201910586045.4, mailed Jun. 2, 2023.

(Continued)

*Primary Examiner* — Nicholas P D'Aniello
(74) *Attorney, Agent, or Firm* — Kilpatrick Townsend & Stockton LLP

(57) ABSTRACT

This application discloses a negative current collector, a negative electrode plate, an electrochemical apparatus, a battery module, a battery pack, and a device. The negative current collector includes a support layer and a metal conductive layer that is disposed on at least one of two opposite surfaces of the support layer in a thickness direction of the support layer. A density of the support layer is less than a density of the metal conductive layer; and the density (Continued)

of the metal conductive layer is 8.0 g/cm$^3$ to 8.96 g/cm$^3$. A thickness $D_1$ of the metal conductive layer is 300 nm≤$D_1$≤2 μm. When a tensile strain of the negative current collector is 2.5%, a sheet resistance growth rate T of the metal conductive layer is T≤5%.

20 Claims, 5 Drawing Sheets

(51) Int. Cl.
*H01M 10/0525* (2010.01)
*H01M 4/02* (2006.01)

(56) References Cited

U.S. PATENT DOCUMENTS

| | | | |
|---|---|---|---|
| 2016/0133348 | A1 | 5/2016 | Kang et al. |
| 2018/0301709 | A1* | 10/2018 | Qiu ............... C23C 14/205 |
| 2019/0173089 | A1 | 6/2019 | Liang et al. |
| 2019/0173090 | A1 | 6/2019 | Liang et al. |
| 2020/0295377 | A1 | 9/2020 | Liang et al. |

FOREIGN PATENT DOCUMENTS

| | | | | |
|---|---|---|---|---|
| CN | 106981665 A | * | 7/2017 | ............ C23C 14/081 |
| CN | 107154499 A | | 9/2017 | |
| CN | 109269709 A | | 1/2019 | |
| CN | 109698315 A | | 4/2019 | |
| CN | 109873163 A | | 6/2019 | |
| CN | 109873164 A | | 6/2019 | |
| CN | 109873166 A | | 6/2019 | |
| JP | 2004022466 A | | 1/2004 | |
| WO | WO2019109928 A1 | | 6/2019 | |

OTHER PUBLICATIONS

Baldwin et al., Battery Separator Characterization and Evaluation Procedures for NASA's Advanced Lithium-Ion Batteries, NASA/TM—2010-216099, May 2010, available at http://gltrs_grc_nasa.gov, 70 pgs.
Contemporary Amperex Technology Co., Limited, Extended European Search Report, EP19930164.9, Jul. 19, 2021, 8 pgs.
Contemporary Amperex Technology Co., Limited, Communication Pursuant to Article 94(3), EP19930164.9, Jul. 20, 2022, 7 pgs.
Contemporary Amperex Technology Co., Limited, International Search Report and Written Opinion, PCT/CN2019/119740, Mar. 31, 2020, 16 pgs.
Decision of Rejection received in the corresponding Chinese Application 201910586045.4, issued on Aug. 30, 2023.
Xinliang Feng, "Nanocarbons for Advanced Energy Storage", published on Wiley-VCH on Mar. 20, 2015, p. 158-160.

* cited by examiner

NEGATIVE CURRENT COLLECTOR, NEGATIVE ELECTRODE PLATE, ELECTROCHEMICAL APPARATUS, BATTERY MODULE, BATTERY PACK, AND DEVICE

CROSS-REFERENCE TO RELATED APPLICATIONS

This application is a continuation application of PCT Patent Application No. PCT/CN2019/119740, entitled "NEGATIVE CURRENT COLLECTOR, NEGATIVE ELECTRODE PLATE, ELECTROCHEMICAL APPARATUS, BATTERY MODULE, BATTERY PACK, AND DEVICE" filed on Nov. 20, 2019, which claims priority to Chinese Patent Application No. 201910586045.4, filed with the State Intellectual Property Office of the People's Republic of China on Jul. 1, 2019, and entitled "NEGATIVE CURRENT COLLECTOR, NEGATIVE ELECTRODE PLATE, AND ELECTROCHEMICAL APPARATUS", all of which are incorporated herein by reference in their entirety.

TECHNICAL FIELD

This application relates to the field of electrochemical apparatus technologies, and in particular, to a negative current collector, a negative electrode plate, an electrochemical apparatus, a battery module, a battery pack, and a device.

BACKGROUND

Secondary batteries are widely used in electric vehicles and consumer electronics because of the advantages of high energy density, high output power, long cycle life, and low environmental pollution. With continuous expansion of the application scope of the secondary batteries, people have imposed increasingly high requirements on the energy density of the secondary batteries. A metal current collector used in the prior art has a relatively large thickness (usually 18 μm to 30 μm) and a relatively high density, resulting in a low energy density of the secondary battery, which cannot meet the increasingly high requirements on the market. Therefore, how to reduce the weight of the current collector to increase the energy density of the secondary battery while ensuring good conductivity and current collection performance for the current collector is a technical issue to be resolved.

SUMMARY

Embodiments of this application provide a negative current collector, a negative electrode plate, an electrochemical apparatus, a battery module, a battery pack, and a device, so that the negative current collector has both a small weight and good conductivity and current collection performance, and therefore the electrochemical apparatus has both a higher weight energy density and good electrochemical performance.

A first aspect of the embodiments of this application provides a negative current collector that includes a support layer and a metal conductive layer that is disposed on at least one of two opposite surfaces of the support layer in a thickness direction of the support layer. A density of the support layer is less than a density of the metal conductive layer, and the density of the metal conductive layer is 8.0 g/cm³ to 8.96 g/cm³. A thickness $D_1$ of the metal conductive layer is 300 nm≤$D_1$≤2 μm, preferably 500 nm≤$D_1$≤1.5 μm. When a tensile strain of the negative current collector is 2.5%, a sheet resistance growth rate T of the metal conductive layer is T≤5%, preferably T≤2.5%, or more preferably T≤1%.

A second aspect of the embodiments of this application provides a negative electrode plate that includes a negative current collector and a negative electrode active material layer disposed on the negative current collector, and the negative current collector is the negative current collector according to the first aspect of the embodiments of this application.

A third aspect of the embodiments of this application provides an electrochemical apparatus that includes a positive electrode plate, a negative electrode plate, a separator, and an electrolyte, where the negative electrode plate is the negative electrode plate according to the second aspect of the embodiments of this application.

A fourth aspect of this application provides a battery module that includes the electrochemical apparatus according to the third aspect of this application.

A fifth aspect of this application provides a battery pack that includes the battery module according to the fourth aspect of this application.

A sixth aspect of this application provides a device that includes the electrochemical apparatus according to the third aspect of this application, and the electrochemical apparatus serves as a power supply of the device.

In some embodiments, the device includes a mobile device, an electric vehicle, an electric train, a satellite, a ship, and an energy storage system.

According to the negative current collector provided in the embodiments of this application, the metal conductive layer with the smaller thickness is disposed on at least one surface of the support layer, and the density of the support layer is less than the density of the metal conductive layer, greatly reducing the weight of the negative current collector compared to the conventional metal current collector, and therefore significantly improving the weight energy density of the electrochemical apparatus. In addition, when the density of the metal conductive layer is 8.0 g/cm³ to 8.96 g/cm³ and the tensile strain of the negative current collector is 2.5%, the sheet resistance growth rate of the metal conductive layer is less than 5%, effectively avoiding a sharp resistance increase caused by tensile deformation for the metal conductive layer with the smaller thickness, ensuring good conductivity and current collection performance for the negative current collector and providing low impedance and small negative-electrode polarization for the electrochemical apparatus. Therefore, the electrochemical apparatus has good electrochemical performance.

The battery module, the battery pack, and the device in this application include the electrochemical apparatus described above, and therefore have at least the same advantages as the electrochemical apparatus.

BRIEF DESCRIPTION OF DRAWINGS

To describe the technical solutions in the embodiments of this application more clearly, the following briefly introduces the accompanying drawings required for describing the embodiments of this application. Persons of ordinary skill in the art may still derive other drawings from these accompanying drawings without creative efforts.

Figure 1:
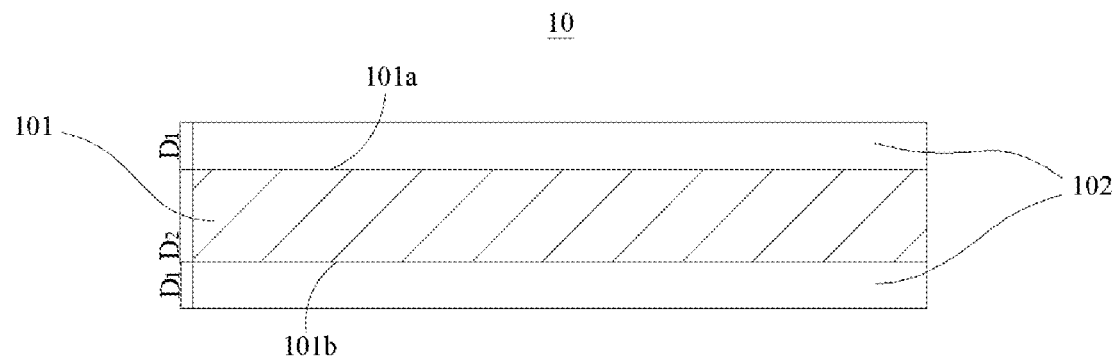
FIG. 1 illustrates a schematic structural diagram of a negative current collector according to an embodiment of this application.

REFERENCE NUMERALS 10. negative current collector;
101. support layer;
101a. first surface; 101b. second surface;
1011. first sublayer; 1012. second sublayer; 1013. third sublayer;
102. metal conductive layer;
103. protective layer;
1. battery pack;
2. upper case;
3. lower case;
4. battery module;
5. electrochemical apparatus.

DESCRIPTION OF EMBODIMENTS

In order to make the objectives, technical solutions and beneficial technical effects of this application clearer, the following further describes this application in detail with reference to the embodiments. It should be understood that the embodiments described in this specification are merely intended to interpret this application rather than to limit this application.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may act as its own lower limit or upper limit to be combined with any other point or individual value or combined with any other lower limit or upper limit to form a range not expressly recorded.

In the description of this specification, it should be noted that, unless otherwise stated, "above" and "below" means inclusion of the number itself, and "more" in "one or more" means at least two.

The foregoing invention content of this application is not intended to describe each of the disclosed embodiments or implementations of this application. The following description illustrates exemplary embodiments in more detail by using examples. Throughout this application, guidance is provided by using a series of embodiments and the embodiments may be used in various combinations. In each instance, enumeration is only representative and should not be interpreted as exhaustive.

Negative Current Collector

Figure 2:
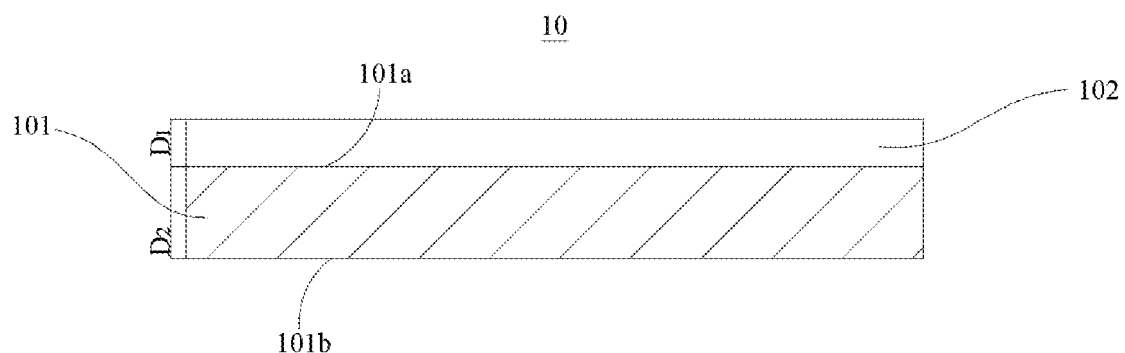
FIG. 2 illustrates a schematic structural diagram of a negative current collector according to another embodiment of this application.

A first aspect of the embodiments of this application provides a negative current collector 10. Referring to FIG. 1 and FIG. 2, the negative current collector 10 includes a support layer 101 and a metal conductive layer 102 that are laminated. The support layer 101 has a first surface 101a and a second surface 101b that are opposite in a thickness direction, and the metal conductive layer 102 is disposed on either or both of the first surface 101a and the second surface 101b of the support layer 101.

A density of the support layer 101 is less than a density of the metal conductive layer, and the density of the metal conductive layer 102 is 8.0 g/cm$^3$ to 8.96 g/cm$^3$. A thickness D1 of the metal conductive layer 102 is 300 nm≤D$_1$≤2 μm, and when a tensile strain of the negative current collector 10 is 2.5%, a sheet resistance growth rate T of the metal conductive layer 102 is T≤5%.

According to the negative current collector 10 provided in this embodiment of this application, the metal conductive layer 102 with a smaller thickness is disposed on at least one surface of the support layer 101, and the density of the support layer is less than the density of the metal conductive layer, greatly reducing a weight of the negative current collector 10 in comparison to a conventional metal current collector (such as a copper foil), and therefore significantly improving a weight energy density of an electrochemical apparatus.

In addition, the negative current collector 10 is sometimes stretched during the processing and use of a negative electrode plate and the electrochemical apparatus, for example, during electrode plate rolling or battery expansion. When the density of the metal conductive layer 102 is 8.0 g/cm$^3$ to 8.96 g/cm$^3$, and the tensile strain of the negative current collector 10 is 2.5%, the sheet resistance growth rate T of the metal conductive layer 102 is T≤5%. In this way, a sharp resistance increase caused by tensile deformation can be avoided effectively for the metal conductive layer 102 with the smaller thickness, ensuring good conductivity and current collection performance for the negative current collector 10 and providing low impedance and small negative-electrode polarization for the electrochemical apparatus. Therefore, the electrochemical apparatus has good electrochemical performance, that is, having both higher rate performance and higher cyclic performance.

With the negative current collector 10 in this embodiment of this application, the electrochemical apparatus has both the higher weight energy density and good electrochemical performance.

In some optional implementations, the thickness $D_1$ of the metal conductive layer 102 may be 2 μm, 1.8 μm, 1.5 μm, 1.2 μm, 1 μm, 900 nm, 800 nm, 700 nm, 600 nm, 500 nm, 450 nm, 400 nm, 350 nm, or 300 nm. The thickness $D_1$ of the metal conductive layer 102 may be in a range formed by any two of the foregoing values. In some embodiments, $D_1$ is 500 nm≤$D_1$≤1.5 μm.

The thickness of the metal conductive layer 102 is less than 2 μm, preferably less than 1.5 μm, which is much less than the thickness of the conventional metal current collector (such as a copper foil). In addition, the density of the support layer 101 is less than the density of the metal conductive layer 102, significantly improving the weight energy density of the electrochemical apparatus. The thickness of the metal conductive layer 102 is more than 300 nm, preferably more than 500 nm, so that the negative current collector 10 has good conductivity and current collection performance, and is also not prone to damages during processing and use of the negative current collector 10. Therefore, the negative current collector 10 has good mechanical stability and a longer service life.

In some optional implementations, the density of the metal conductive layer 102 may be 8.0 g/cm³, 8.1 g/cm³, 8.2 g/cm³, 8.3 g/cm³, 8.4 g/cm³, 8.5 g/cm³, 8.6 g/cm³, 8.7 g/cm³, 8.8 g/cm³, 8.9 g/cm³, 8.96 g/cm³, or the like.

In some optional implementations, when the tensile strain of the negative current collector 10 is 2.5%, the sheet resistance growth rate T of the metal conductive layer 102 may be 5%, 4.5%, 4%, 3.5%, 3%, 2.5%, 2%, 1.5%, 1%, 0.5%, or 0; preferably T≤2.5%, or more preferably T≤1%.

According to the negative current collector 10 in this embodiment of this application, a thickness $D_2$ of the support layer 101 is preferably 1 μm≤$D_2$≤20 μm, for example, may be 1 μm, 1.5 μm, 2 μm, 3 μm, 4 μm, 5 μm, 6 μm, 7 μm, 8 μm, 10 μm, 12 μm, 15 μm, 18 μm, or 20 μm. The thickness $D_2$ of the support layer 101 may be in a range formed by any two of the foregoing values. Preferably $D_2$ is 2 μm≤$D_2$≤10 μm, or more preferably $D_2$ is 2 μm≤$D_2$≤6 μm.

The thickness $D_2$ of the support layer 101 is preferably more than 1 μm, or more preferably more than 2 μm, so that the support layer 101 has a sufficient mechanical strength and is not prone to breakage during the processing and use of the negative current collector 10, to well support and protect the metal conductive layer 102, thereby ensuring good mechanical stability and a longer service life for the negative current collector 10. The thickness $D_2$ of the support layer 101 is preferably less than 20 μm, more preferably less than 10 μm, or still more preferably less than 6 μm, so that the electrochemical apparatus have a smaller volume and weight, improving the energy density of the electrochemical apparatus.

In some embodiments, preferably, a volume resistivity of the support layer 101 is greater than or equal to $1.0 \times 10^{-5}$ Ω·m. Because of the relatively large volume resistivity of the support layer 101, a short-circuit resistance can be increased when an internal short circuit occurs in the electrochemical apparatus in case of exceptions such as nail penetration in the electrochemical apparatus, thereby improving safety performance of the electrochemical apparatus.

In some embodiments, preferably, an elongation at break of the support layer 101 is greater than or equal to an elongation at break of the metal conductive layer 102, better avoiding breakage of the negative current collector 10.

Optionally, the elongation at break of the support layer 101 is greater than or equal to 5%. Further, the elongation at break of the support layer 101 is greater than or equal to 10%.

In some embodiments, a Young's modulus E of the support layer 101 is preferably E≥1.9 GPa. The support layer 101 has appropriate rigidity to satisfy a support and protection role of the support layer 101 for the metal conductive layer 102, ensuring an overall strength of the negative current collector 10. During processing of the negative current collector 10, the support layer 101 is not excessively extended or deformed to avoid breakage of the support layer 101, improving bonding firmness between the support layer 101 and the metal conductive layer 102 to prevent peeling off. In this way, the negative current collector 10 has higher mechanical stability and higher operating stability, and the electrochemical apparatus has higher electrochemical performance, such as a longer cycle life.

Further, the Young's modulus E of the support layer 101 is more preferably 1.9 GPa≤E≤20 GPa, so that the support layer 101 has enough rigidity and is also able to withstand deformation to some extent, being flexible to wind during processing and use of the negative current collector 10 to better prevent breakage.

In some optional implementations, the Young's modulus E of the support layer 101 may be 1.9 GPa, 2.5 GPa, 4 GPa, 5 GPa, 6 GPa, 7 GPa, 8 GPa, 9 GPa, 10 GPa, 11 GPa, 12 GPa, 13 GPa, 14 GPa, 15 GPa, 16 GPa, 17 GPa, 18 GPa, 19 GPa, or 20 GPa. The Young's modulus E of the support layer 101 may be in a range formed by any two of the foregoing values.

In some embodiments, preferably, the support layer 101 uses one or more of a polymer material and a polymer-based composite material. Because the density of the polymer material and the polymer-based composite material is obviously smaller than the density of metal, the negative current collector 10 is obviously lighter than the conventional metal current collector, so that the weight energy density of the electrochemical apparatus is increased.

The polymer material is, for example, one or more of polyamide (PA), polyimide (PI), polyesters, polyolefins, polyynes, silicone polymers, polyethers, polyols, polysulfones, polysaccharide polymers, amino acid polymers, polysulfur nitride, aromatic polymers, aromatic heterocyclic polymers, epoxy resin, phenol-formaldehyde resin, a derivative thereof, a crosslinked product thereof, and a copolymer thereof.

Further, the polymer material is, for example, one or more of polycaprolactam (commonly referred to as nylon 6), polyhexamethylene adipamide (commonly referred to as nylon 66), polyterephthalamide (PPTA), polym-phenylene isophthalamide (PMIA), polyethylene terephthalate (PET), polybutylene terephthalate (PBT), polyethylene naphthalate (PEN), polycarbonate (PC), polyethylene (PE), polypropylene (PP), poly(p-phenylene ether) (PPE), polyvinyl alcohol (PVA), polystyrene (PS), polyvinyl chloride (PVC), polyvinylidene fluoride (PVDF), polytetrafluoroethylene (PTFE), polystyrene sulfonate (PSS), polyacetylene, polypyrrole (PPy), polyaniline (PAN), polythiophene (PT), polypyridine (PPY), silicone rubber (Silicone rubber), polyoxymethylene (POM), polyphenyl, polyphenylene oxide (PPO), polyphenylene sulfide (PPS), polyethylene glycol (PEG), acrylonitrile-butadiene-styrene copolymer (ABS), cellulose, starch, protein, a derivative thereof, a crosslinked product thereof, and a copolymer thereof.

The polymer-based composite material may include, for example, the polymer material and an additive. With the additive, the volume resistivity, elongation at break and Young's modulus of the polymer material can be adjusted. The additive may be one or more of a metal material and an inorganic non-metal material.

The additive of the metal material is, for example, one or more of aluminum, aluminum alloy, copper, copper alloy, nickel, nickel alloy, titanium, titanium alloy, iron, iron alloy, silver, and silver alloy.

The additive of the inorganic non-metallic material is, for example, one or more of a carbon-based material, aluminum oxide, silicon dioxide, silicon nitride, silicon carbide, boron nitride, silicate, and titanium oxide, and for another example, one or more of a glass material, a ceramic material, and a ceramic composite material. The carbon-based material is one or more of graphite, superconducting carbon, acetylene black, carbon black, Ketjen black, carbon dots, carbon nanotube, graphene, and carbon nanofiber.

In some embodiments, the additive may be one or more of metal-coated carbon-based materials, such as nickel-coated graphite powder and nickel-coated carbon fiber.

In some embodiments, the support layer 101 uses one or more of an insulating polymer material and an insulating polymer-based composite material. The support layer 101 has the relatively large volume resistivity, thereby improving the safety performance of the electrochemical apparatus.

Further, preferably, the support layer 101 uses one or more of polyethylene terephthalate (PET), polybutylene terephthalate (PBT), polyethylene naphthalate (PEN), polystyrene sulfonate (PSS), and polyimide (PI).

In the negative current collector 10 in this embodiment of this application, the support layer 101 may be a single-layer structure, or may be a composite-layer structure of two or more layers, such as two layers, three layers, or four layers.

Figure 3:
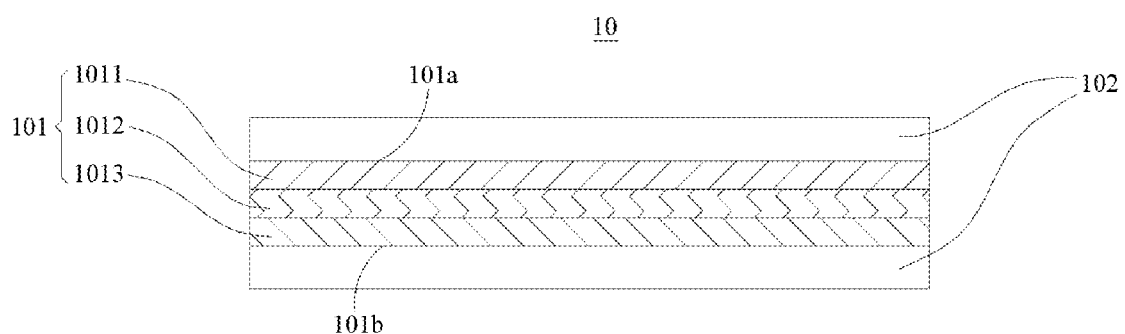
FIG. 3 illustrates a schematic structural diagram of a negative current collector according to another embodiment of this application.

As an example of the composite-layer structure of the support layer 101, referring to FIG. 3, the support layer 101 is a composite-layer structure formed by laminating a first sublayer 1011, a second sublayer 1012, and a third sublayer 1013. The support layer 101 of the composite-layer structure has a first surface 101a and a second surface 101b that are opposite, and the metal conductive layer 102 is laminated on the first surface 101a and the second surface 101b of the support layer 101. Certainly, the metal conductive layer 102 may be disposed only on the first surface 101a of the support layer 101, or may be disposed only on the second surface 101b of the support layer 101.

When the support layer 101 is a composite-layer structure of at least two layers, the material of each sublayer may be the same or different.

In some embodiments, a material of the metal conductive layer 102 is one or more of copper, copper alloy, nickel, nickel alloy, titanium, titanium alloy, silver, and silver alloy, preferably one or more of copper, copper alloy, nickel, nickel alloy, titanium, and silver, or more preferably one or more of copper and copper alloy.

The nickel alloy is, for example, a nickel-copper alloy.

A weight percent composition of a copper element in the copper alloy is preferably more than 90%.

In some embodiments, the volume resistivity of the metal conductive layer 102 is preferably $1.3 \times 10^{-8}$ $\Omega \cdot m$ to $3.3 \times 10^{-8}$ $\Omega \cdot m$, so that the negative current collector 10 has better conductivity and current collector performance, improving performance of the electrochemical apparatus, that is, improving rate performance and cyclic performance of the electrochemical apparatus. More preferably, a volume resistivity of the metal conductive layer 102 is $1.8 \times 10^{-8}$ $\Omega \cdot m$ to $2.3 \times 10^{-8}$ $\Omega \cdot m$.

In some embodiments, referring to FIG. 4 to FIG. 9, the negative current collector 10 further optionally includes a protective layer 103. Specifically, the metal conductive layer 102 includes two opposite surfaces in a thickness direction of the metal conductive layer 102, and the protective layer 103 is laminated on either or both of the two surfaces of the metal conductive layer 102 to protect the metal conductive layer 102 from damages such as chemical corrosion or mechanical damages, thereby ensuring operating stability and a service life for the negative current collector 10, and improving electrochemical performance of the electrochemical apparatus. In addition, the protective layer 103 can further enhance the mechanical strength of the negative current collector 10.

A material of the protective layer 103 may be one or more of metal, metal oxide, and conductive carbon. The protective layer 103 made of the metal material is a metal protective layer. The protective layer 103 made of the metal oxide material is a metal oxide protective layer.

The metal is, for example, one or more of nickel, chromium, a nickel-based alloy, and a copper-based alloy. The nickel-based alloy is an alloy formed by adding one or more other elements to pure nickel, preferably a nickel-chromium alloy. The nickel-chromium alloy is an alloy formed by metal nickel and metal chromium. Optionally, a weight ratio of nickel to chromium in the nickel-chromium alloy is 1:99 to 99:1, for example, 9:1. The copper-based alloy is an alloy formed by adding one or more other elements to pure copper, preferably a nickel-copper alloy. Optionally, a weight ratio of nickel to copper in the nickel-copper alloy is 1:99 to 99:1, for example, 9:1.

The metal oxide is, for example, one or more of aluminum oxide, cobalt oxide, chromium oxide, and nickel oxide.

The conductive carbon is, for example, one or more of graphite, superconducting carbon, acetylene black, carbon black, Ketjen black, carbon dots, carbon nanotube, grapheme, and carbon nanofiber, preferably one or more of carbon black, carbon nanotube, acetylene black, and graphene.

Figure 4:
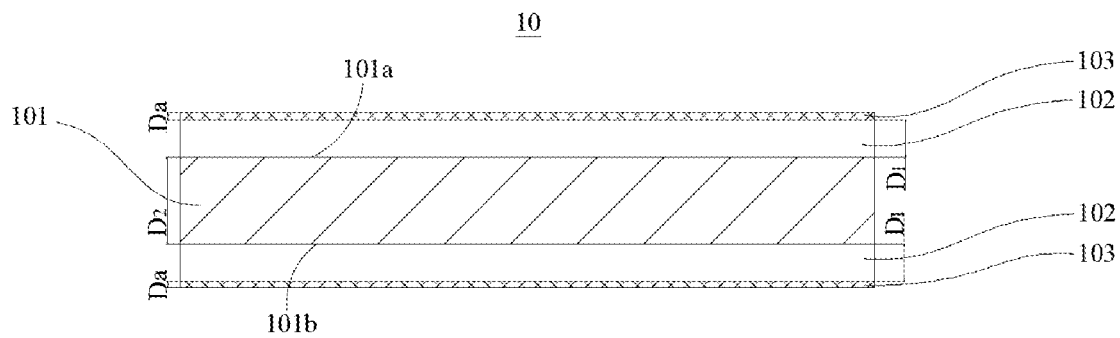
FIG. 4 illustrates a schematic structural diagram of a negative current collector according to another embodiment of this application.
Figure 5:
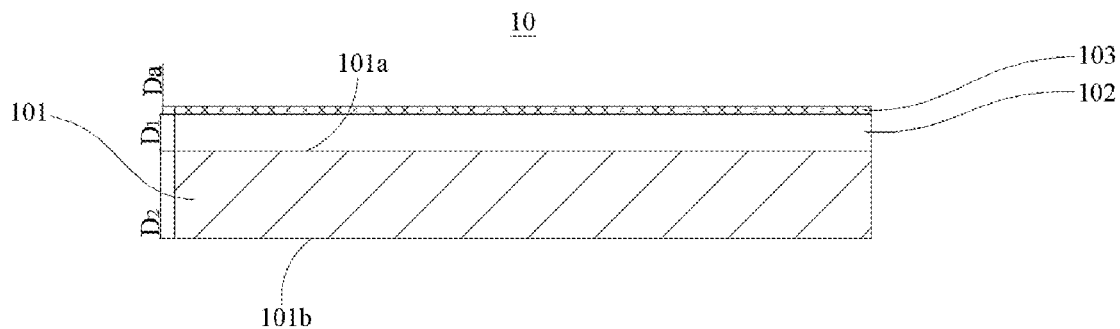
FIG. 5 illustrates a schematic structural diagram of a negative current collector according to another embodiment of this application.

As some examples, referring to FIG. 4 and FIG. 5, the negative current collector 10 includes the support layer 101, the metal conductive layer 102, and the protective layer 103 that are laminated. The support layer 101 has the first surface 101a and the second surface 101b that are opposite in the thickness direction. The metal conductive layer 102 is laminated on at least one of the first surface 101a and the second surface 101b of the support layer 101, and the protective layer 103 is laminated on a surface of the metal conductive layer 102 facing away from the support layer 101.

The protective layer 103 (referred to as an upper protective layer) is disposed on the surface of the metal conductive layer 102 facing away from the support layer 101, to protect the metal conductive layer 102 from chemical corrosion and mechanical damages. This can also optimize an interface between the negative current collector 10 and a negative electrode active material layer, and increase the bonding force between the negative current collector 10 and the negative electrode active material layer.

In some embodiments, the upper protective layer of the negative current collector 10 may be a protective layer of metal oxide, such as alumina oxide, cobalt oxide, nickel oxide, or chromium oxide. The metal oxide protective layer features high hardness and a high mechanical strength, is larger than a surface area, and has better corrosion resistance performance, so as to better protect the metal conductive layer 102.

Further, the upper protective layer of the negative current collector 10 is preferably a metal protective layer, where the metal protective layer can improve the conductivity of the negative current collector 10, reduce battery polarization, reduce the risk of lithium precipitation on the negative electrode, and improve cyclic performance and safety performance of the electrochemical apparatus; or more preferably, is a double protective layer, that is, a composite layer formed by a metal protective layer and a metal oxide protective layer, where preferably, the metal protective layer is disposed on a surface of the metal conductive layer 102 facing away from the support layer 101 and the metal oxide protective layer is disposed on a surface of the metal protective layer facing away from the support layer 101. This can improve both conductivity performance and corrosion resistance performance of the negative current collector 10, and improve an interface between the metal conductive layer 102 and the negative electrode active material layer, to obtain the negative current collector 10 with better comprehensive performance.

Figure 6:
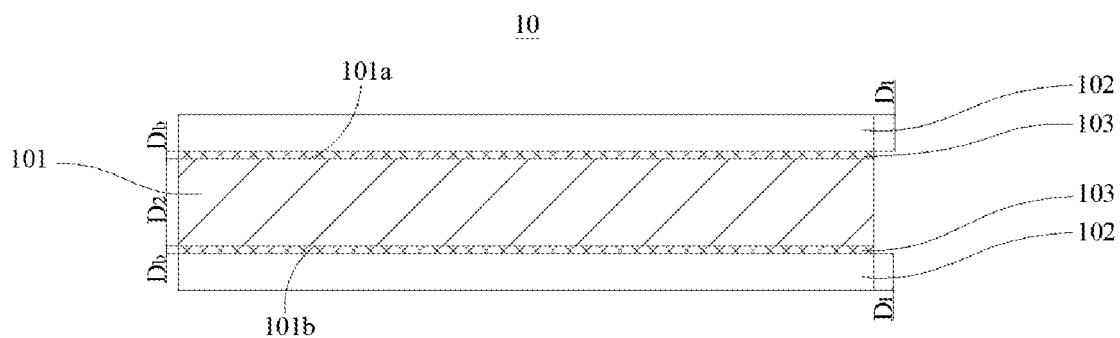
FIG. 6 illustrates a schematic structural diagram of a negative current collector according to another embodiment of this application.
Figure 7:
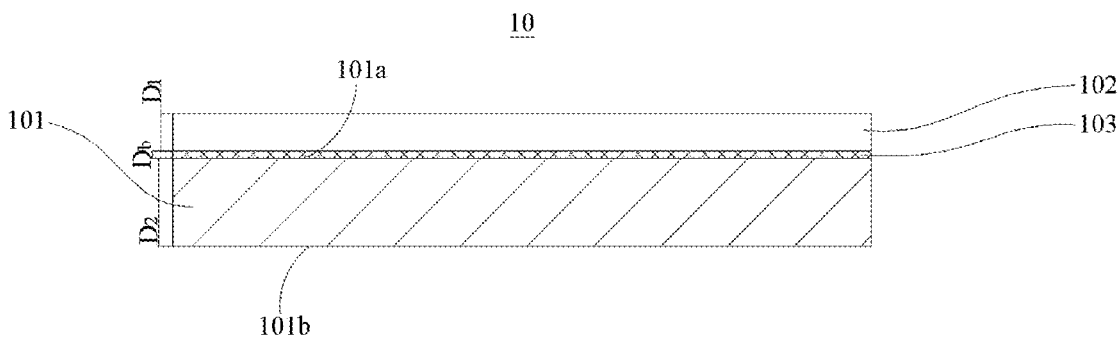
FIG. 7 illustrates a schematic structural diagram of a negative current collector according to another embodiment of this application.

As some other examples, referring to FIG. 6 and FIG. 7, the negative current collector 10 includes the support layer 101, the metal conductive layer 102, and the protective layer 103 that are laminated. The support layer 101 has the first surface 101a and the second surface 101b that are opposite in the thickness direction. The metal conductive layer 102 is laminated on at least one of the first surface 101a and the second surface 101b of the support layer 101, and the protective layer 103 is laminated on a surface of the metal conductive layer 102 facing the support layer 101.

The protective layer 103 (referred to as a lower protective layer) is provided on the surface of the metal conductive layer 102 facing the support layer 101. The lower protective layer protects the metal conductive layer 102 from chemical corrosion and mechanical damages, and can also increase the bonding force between the metal conductive layer 102 and the support layer 101, preventing the metal conductive layer 102 from being separated from the support layer 101, and improving a supporting and protection role of the support layer 101 for the metal conductive layer 102.

Optionally, the lower protective layer is a metal oxide or metal protective layer. The metal oxide protective layer has relatively high corrosion resistance performance, and is larger than a surface area, further improving the interface bonding force between the metal conductive layer 102 and the support layer 101. In this way, the lower protective layer can better protect the metal conductive layer 102, thereby improving performance of the electrochemical apparatus. Moreover, the metal oxide protective layer has higher hardness and a better mechanical strength, further improving the strength of the negative current collector 10. In addition to protecting the metal conductive layer 102 from chemical corrosion and mechanical damages, the metal protective layer can improve the conductivity of the negative current collector 10, reduce battery polarization, and reduce the risk of lithium precipitation on the negative electrode, improving the cyclic performance and safety performance of the electrochemical apparatus. Therefore, the lower protective layer of the negative current collector 10 is preferably a metal protective layer.

Figure 8:
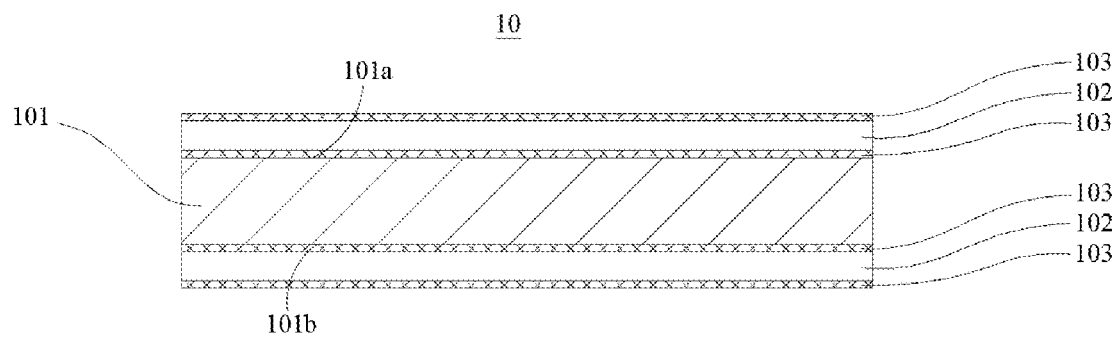
FIG. 8 illustrates a schematic structural diagram of a negative current collector according to another embodiment of this application.
Figure 9:
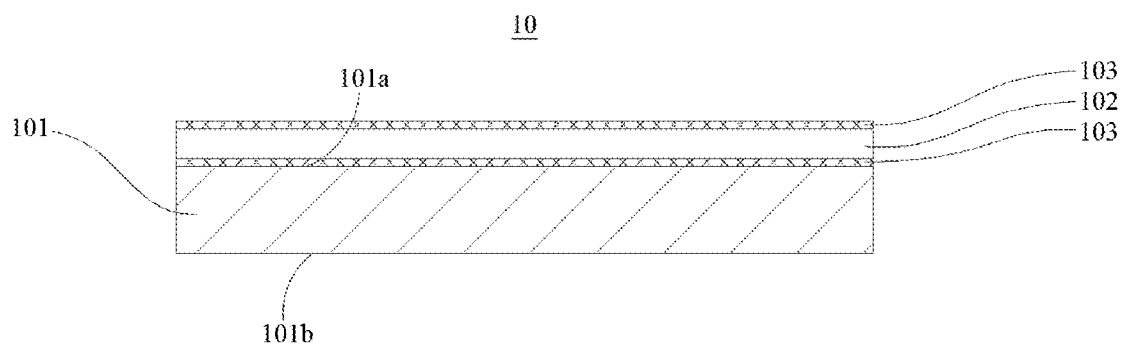
FIG. 9 illustrates a schematic structural diagram of a negative current collector according to another embodiment of this application.

As still some examples, referring to FIG. 8 and FIG. 9, the negative current collector 10 includes the support layer 101, the metal conductive layer 102, and the protective layer 103 that are laminated. The support layer 101 has the first surface 101a and the second surface 101b that are opposite in the thickness direction. The metal conductive layer 102 is laminated on at least one of the first surface 101a and the second surface 101b of the support layer 101, and the protective layer 103 is laminated on the surface of the metal conductive layer 102 facing away from the support layer 101 and the surface facing the support layer 101.

The protective layer 103 is provided on two surfaces of the metal conductive layer 102, that is, an upper protective layer and a lower protective layer are disposed on the metal conductive layer 102, so as to better protect the metal conductive layer 102 and make the negative current collector 10 have better comprehensive performance.

It can be understood that the protective layer 103 on the two surfaces of the metal conductive layer 102 may be the same or different in material and thickness.

In some embodiments, a thickness $D_3$ of the protective layer 103 is 1 nm$\leq D_3 \leq$200 nm and $D_3 \leq 0.1 D_1$. The protective layer 103 with the thickness $D_3$ in the foregoing range can effectively protect the metal conductive layer 102 and also make the electrochemical apparatus have a higher energy density.

In some embodiments, the thickness $D_3$ of the protective layer 103 may be 200 nm, 180 nm, 150 nm, 120 nm, 100 nm, 80 nm, 60 nm, 55 nm, 50 nm, 45 nm, 40 nm, 30 nm, 20 nm, 18 nm, 15 nm, 12 nm, 10 nm, 8 nm, 5 nm, 2 nm, or 1 nm, and the thickness $D_3$ of the protective layer 103 may be in a range formed by any two of the foregoing values. In some embodiments, 5 nm$\leq D_3 \leq$200 nm, or more preferably, 10 nm$\leq D_3 \leq$200 nm.

Further, when the protective layer 103 is disposed on the two surfaces of the metal conductive layer 102, that is, the upper protective layer and the lower protective layer are respectively disposed on the two surfaces of the metal conductive layer 102, a thickness $D_a$ of the upper protective layer is 1 nm$\leq D_a \leq$200 nm and $D_a \leq 0.1 D_1$, and a thickness $D_b$ of the lower protective layer is 1 nm$\leq D_b \leq$200 nm and $D_b \leq 0.1 D_1$. In some embodiments, $D_a > D_b$, so that the protective layer 103 better protects the metal conductive layer 102, and the electrochemical apparatus has a higher weight energy density. More preferably, $0.5 D_a \leq D_b \leq 0.8 D_a$.

The metal conductive layer 102 may be formed on the support layer 101 by means of at least one of mechanical rolling, bonding, vapor deposition (vapor deposition), electroless plating (Electroless plating), and electroplating (electroplating). In some embodiments, vapor deposition and electroplating are used, that is, the metal conductive layer 102 is preferably a vapor deposition layer or an electroplating layer, so as to bond the metal conductive layer 102 and the support layer 101 tightly, and make the support layer 101 effectively play a supporting role for the metal conductive layer 102.

In some embodiments, the bonding force between the support layer 101 and the metal conductive layer 102 is F$\geq$100 N/m, or more preferably F$\geq$400 N/m.

For example, the metal conductive layer 102 is formed on the support layer 101 by using the vapor deposition method. Conditions of the vapor deposition process such as a deposition temperature, a deposition rate, and an atmosphere condition of a deposition chamber are properly controlled to make the sheet resistance growth rate of the metal conductive layer 102 meet the aforementioned requirement when the negative current collector 10 is stretched.

The vapor deposition method is preferably a physical vapor deposition (Physical Vapor Deposition, PVD) method. The physical vapor deposition method is preferably at least one of an evaporation method and a sputtering method. The evaporation method is preferably at least one of a vacuum evaporation method, a thermal evaporation method, and an electron beam evaporation method. The sputtering method is preferably a magnetron sputtering method.

As an example, forming the metal conductive layer 102 by using the vacuum evaporation method includes: placing the surface-cleaned support layer 101 in a vacuum plating chamber, melting and evaporating a high-purity metal wire in a metal evaporation chamber at a high temperature of 1300° C. to 2000° C., and processing the evaporated metal by using a cooling system in the vacuum plating chamber, to finally obtain a deposition on the support layer 101 to form the metal conductive layer 102.

A process of forming the metal conductive layer 102 by using the mechanical rolling method may include: placing a metal sheet in a mechanical roller, rolling the metal sheet to a predetermined thickness by applying a pressure of 20 t to 40 t, placing the metal sheet on a surface of the surface-cleaned support layer 101, and then placing the two in the mechanical roller, so as to tightly combine the two by applying a pressure of 30 t to 50 t.

A process of forming the metal conductive layer 102 by means of bonding may include: placing a metal sheet in the mechanical roller, rolling the metal sheet to a predetermined thickness by applying a pressure of 20 t to 40 t, coating a mixed solution of polyvinylidene fluoride (PVDF) and N-methylpyrrolidone (NMP) on a surface of the surface-cleaned support layer 101, finally bonding the metal conductive layer 102 with the predetermined thickness to the surface of the support layer 101, and drying them by heat to make the two tightly combined.

When the negative current collector 10 has the protective layer 103, the protective layer 103 may be formed on the metal conductive layer 102 by using at least one of the vapor deposition method, an in-situ formation method, and a coating method. The vapor deposition method may be the vapor deposition method described above. The in-situ formation method is preferably an in-situ passivation method, that is, a method for forming a metal oxide passivation layer in an original place on the metal surface. The coating method is preferably at least one of roller coating, extrusion coating, blade coating, and gravure coating.

In some embodiments, the protective layer 103 is formed on the metal conductive layer 102 by using at least one of the vapor deposition method and the in-situ formation method, so as to provide a higher bonding force between the metal conductive layer 102 and the protective layer 103, make the protective layer 103 better protect the negative current collector 10, and ensure higher operating performance for the negative current collector 10.

In this embodiment of this application, a density of the metal conductive layer may be determined through measurement by using a method known in the art: in an example, cutting a negative current collector (whose metal conductive layer is metallic copper) with an area of 10 cm², using a balance accurate to 0.0001 g to obtain a weigh denoted by $m_1$ in units of g, and measuring the thickness at 20 positions by using a micrometer to obtain an average value denoted by $d_1$ in units of μm; immersing the negative current collector in 1 mol/L $FeCl_3$ aqueous solution for 12 h, waiting until the metal conductive layer is fully dissolved, taking out the support layer to rinse with deionized water for 5 times, baking the support layer at 100° C. for 20 min, using the same balance to obtain a weigh denoted by $m_2$ in units of g, measuring the thickness at 20 positions by using the same micrometer to obtain an average value denoted by $d_2$ in units of μm, and calculating the density of the metal conductive layer in units of g/cm³ according to the following formula:

$$\text{Density of the metal conductive layer} = \frac{(m_1 - m_2)}{(d_1 - d_2)/1000}$$

Testing is conducted on five same-size negative current collectors to obtain the density of the metal conductive layer, using an average value as the result.

If a tensile strain of the negative current collector is set to ε, and ε=ΔL/L×100%, where ΔL is an elongation obtained by stretching the negative current collector, and L is an original length of the negative current collector, that is, a length before stretching.

When the tensile strain ε of the negative current collector is 2.5%, the sheet resistance growth rate T of the metal conductive layer can be determined through measurement by using a method known in the art: in an example, cutting the negative current collector to obtain a 20 mm×200 mm sample, measuring a sheet resistance in a central region of the sample by using a four-probe method, recording the sheet resistance as $R_1$, stretching the central region of the sample by using a GOTECH tension tester, configuring initial settings to obtain a sample length of 50 mm between jigs, stretching the sample at a speed of 50 mm/min and at a stretching distance being 2.5% of the original length of the sample, taking out the stretched sample, testing the sheet resistance of the metal conductive layer between the jigs, recording the sheet resistance as $R_2$, and calculating, according to a formula T=$(R_2-R_1)/R_1$×100%, the sheet resistance growth rate T of the metal conductive layer when the tensile strain of the negative current collector is 2.5%.

The sheet resistance of the metal conductive layer is tested by using the four-probe method as follows: using the RTS-9 double electric four-probe tester in a test environment with a normal temperature of 23±2° C., 0.1 MPa, and relative humidity≤65%. The test is conducted as follows: cleaning a surface of the sample, placing the sample horizontally on a test bench, placing the four probes to make the probes in good contact with the surface of the metal conductive layer, adjusting an auto-test mode, calibrating a current range of the sample, measuring the sheet resistance in an appropriate current range, and collecting 8 to 10 data points of the same sample for data measurement accuracy and error analysis; finally, obtaining an average value as the sheet resistance value of the metal conductive layer.

The volume resistivity of the metal conductive layer is set to ρ, and ρ=$R_S$×d, where a unit of ρ is Ω·m, $R_S$ is the sheet resistance of the metal conductive layer in units of Ω, and d is the thickness of the metal conductive layer in units of m. The sheet resistance $R_S$ of the metal conductive layer can be measured by using the four-probe method described above, which is not repeated herein.

The volume resistivity of the support layer is a volume resistivity at 20° C., and can be determined through measurement by using a method known in the art. In an example, the test is conducted in a room with a constant temperature, a normal pressure, and a low humidity (20° C., 0.1 MPa, RH≤20%). A disk support layer sample with a diameter of 20 mm (the sample size can be adjusted based on an actual size of a test instrument) is prepared. The test is conducted by using a tri-electrode surface resistivity method (GBT1410-2006) with an insulation resistance tester (with a precision of 10Ω). The test method is as follows: placing the disk sample between two electrodes and applying a potential difference between the two electrodes to distribute generated current in the disk sample, and using a picoammeter or electrometer for measuring to avoid measurement errors caused by inclusion of a surface leakage current during measurement. A reading is the volume resistivity in units of Ω·m.

An elongation at break of the support layer may be determined through measurement by using a method known in the art: in an example, cutting the support layer to obtain a sample of 15 mm×200 mm, conducting a tension test at a normal temperature and a normal pressure (25° C., 0.1 MPa) by using a GOTECH tension tester, configuring initial settings to obtain a sample length of 50 mm between jigs, stretching the sample at a speed of 50 mm/min, and recording a device displacement y (mm) upon breakage out of stretching; finally calculating the elongation at break based on (y/50)×100%. The elongation at break of the metal conductive layer can be easily determined through measurement by using the same method.

A Young's modulus E of the support layer can be determined through measurement by a method known in the art: in an example, cutting the support layer to obtain a sample of 15 mm×200 mm, measuring a sample thickness l (μm) by using a micrometer, conducting a tension test at a normal temperature and a normal pressure (25° C., 0.1 MPa) by using a GOTECH tension tester, configuring initial settings to obtain a sample length of 50 mm between jigs, stretching the sample at a speed of 50 mm/min, recording a load Q (N) and a device displacement z (mm) upon breakage out of stretching, where the stress $\xi$(GPa)=Q/(15×l) and the strain $\eta$=z/50, drawing a stress-strain curve, and obtaining an initial linear curve, where a slope of the curve is the Young's modulus E.

The bonding force F between the support layer and the metal conductive layer may be tested by using a method known in the art: for example, selecting the negative current collector whose metal conductive layer disposed on one surface of the support layer as a to-be-tested sample at a width h of 0.02 m, evenly attaching a 3M double-sided adhesive to a stainless steel plate at a normal temperature and a normal pressure (25° C., 0.1 MPa), evenly attaching the to-be-tested sample to the double-sided adhesive, peeling the metal conductive layer from the support layer of the to-be-tested sample by using the GOTECH tension tester, obtaining a maximum tensile force x (N) based on readings of a tensile force and displacement diagram, and calculating the bonding force F (N/m) between the metal conductive layer and the support layer according to F=x/h.

Negative Electrode Plate

A second aspect of the embodiments of this application provides a negative electrode plate, including a negative current collector and a negative electrode active material layer that are laminated, where the negative current collector is the negative current collector 10 according to the first aspect of the embodiments of this application.

With the negative current collector 10 in the first aspect of this embodiment of this application, the negative electrode plate in this embodiment of this application has a high weight energy density and good electrochemical performance than a conventional negative electrode plate.

As an example, the negative electrode plate includes a support layer 101, a metal conductive layer 102, and a negative electrode active material layer that are laminated. The support layer 101 includes a first surface 101a and/or a second surface 101b that are opposite, the metal conductive layer 102 is laminated on the first surface 101a and/or the second surface 101b of the support layer 101, and the negative electrode active material layer is laminated on a surface of the metal conductive layer 102 facing away from the support layer 101.

For the negative electrode plate in this embodiment of this application, the negative electrode active material layer may use a negative electrode active material known in the art. For example, the negative electrode active material for the lithium-ion secondary battery may be one or more of metal lithium, natural graphite, artificial graphite, mesophase carbon microbeads (MCMB for short), hard carbon, soft carbon, silicon, silicon-carbon composite, SiO, Li—Sn alloy, Li—Sn—O alloy, Sn, SnO, $SnO_2$, spinel-structure lithium titanate, and Li—Al alloy.

Optionally, the negative electrode active material layer may further include a conductive agent. As an example, the conductive agent is one or more of graphite, superconducting carbon, acetylene black, carbon black, Ketjen black, carbon dots, carbon nanotube, graphene, and carbon nanofiber.

Optionally, the negative electrode active material layer may further include a binder. As an example, the binder is one or more of styrene-butadiene rubber (SBR), water-based acrylic resin (water-based acrylic resin), carboxymethyl cellulose (CMC), polyvinylidene fluoride (PVDF), polytetrafluoroethylene (PTFE), ethylene vinyl acetate copolymer (EVA), polyvinyl alcohol (PVA), and polyvinyl butyral (PVB).

The negative electrode plate may be prepared by using a conventional method in the art. Usually, the negative electrode active material and optionally, the conductive agent and the binder are dispersed in a solvent, to obtain a uniform negative electrode paste, where the solvent may be N-methylpyrrolidone (NMP) or deionized water. The negative electrode paste is coated on the negative current collector and undergoes processes such as drying to obtain the negative electrode plate.

Electrochemical Apparatus

A third aspect of the embodiments of this application provides an electrochemical apparatus, where the electrochemical apparatus includes a positive electrode plate, a negative electrode plate, a separator, and an electrolyte, where the negative electrode plate is the negative electrode plate according to the second aspect of the embodiments of this application.

The electrochemical apparatus may be a lithium-ion secondary battery, a lithium primary battery, a sodium-ion battery, or a magnesium-ion battery, which is not limited thereto.

The electrochemical apparatus uses the negative electrode plate according to the second aspect of the embodiments of this application, so that the electrochemical apparatus in this embodiment of this application has a higher weight energy density and good electrochemical performance.

The positive electrode plate may include a positive current collector and a positive electrode active material layer disposed on the positive current collector.

The positive current collector may be a metal foil or a porous metal foil including one or more of aluminum, aluminum alloy, nickel, nickel alloy, titanium, titanium alloy, silver, and silver alloy.

The positive electrode active material layer may use a positive electrode active material known in the art. For example, the positive electrode active material for the lithium-ion secondary battery may be a lithium transition metal compound oxide, where the transition metal may be one or more of Mn, Fe, Ni, Co, Cr, Ti, Zn, V, Al, Zr, Ce, and Mg. Elements with high electronegativity, such as one or more of S, F, Cl, and I, may be also added to the lithium transition metal composite oxide, so that the positive electrode active material has higher structural stability and higher electrochemical performance. As an example, the lithium transition metal composite oxide is, for example, one or more of $LiMn_2O_4$, $LiNiO_2$, $LiCoO_2$, $LiNi_{1-y}Co_yO_2$ (0<y<1), $LiNi_aCo_bAl_{1-a-b}O_2$ (0<a<1, 0<b<1, 0<a+b<1), $LiMn_{1-m-n}Ni_mCo_nO_2$ (0<m<1, 0<n<1, 0<m+n<1), $LiMPO_4$ (M may be one or more of Fe, Mn, and Co), and $Li_3V_2(PO_4)_3$.

Optionally, the positive electrode active material layer may further include a conductive agent. As an example, the conductive agent is one or more of graphite, superconducting carbon, acetylene black, carbon black, Ketjen black, carbon dots, carbon nanotube, graphene, and carbon nanofiber.

Optionally, the positive electrode active material layer may further include a binder. As an example, the binder is one or more of styrene-butadiene rubber (SBR), water-based acrylic resin (water-based acrylic resin), carboxymethyl cellulose (CMC), polyvinylidene fluoride (PVDF), polytetrafluoroethylene (PTFE), ethylene vinyl acetate copolymer (EVA), polyvinyl alcohol (PVA), and polyvinyl butyral (PVB).

The positive electrode plate may be prepared by using a conventional method in the art. Usually, the positive electrode active material and optionally, the conductive agent and the binder are dispersed in a solvent (such as NMP) to obtain a uniform positive electrode paste. The positive electrode paste is coated on the positive current collector and undergoes processes such as drying to obtain the positive electrode plate.

There is no particular limitation on the aforementioned separator, and any known porous separators with electrochemical and chemical stability can be selected, for example, mono-layer or multi-layer membranes made of one or more of glass fiber, nonwoven fabric, polyethylene, polypropylene, and polyvinylidene fluoride may be used.

The electrolyte includes an organic solvent and electrolyte salt. The organic solvent, as a medium for transferring ions in electrochemical reactions, may use an organic solvent for the electrolyte of the electrochemical apparatus known in the art. The electrolyte salt, as a source of ions, may be electrolyte salt for the electrolyte of the electrochemical apparatus known in the art.

For example, the organic solvent used in the lithium-ion secondary batteries may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl sulfone (ESE).

For example, the electrolytic salt used in the lithium-ion secondary batteries may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bisfluorosulfonyl imide), LiTFSI (lithium bis-trifluoromethanesulfon imide), LiTFS (lithium trifluoromethanesulfonat), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate).

The positive electrode plate, the separator, and the negative electrode plate are stacked in sequence, so that the separator is isolated between the positive electrode plate and the negative electrode plate to obtain a battery core, or are wound to obtain the battery core. To prepare the electrochemical apparatus, the battery core is placed in a packing housing and the electrolyte was injected and sealed.

Battery Module

A fourth aspect of the embodiments of this application provides a battery module, where the battery module includes any one or more of the electrochemical apparatuses according to the third aspect of this application.

Further, a quantity of electrochemical apparatuses included in the battery module may be adjusted based on application and a capacity of the battery module.

Figure 10:
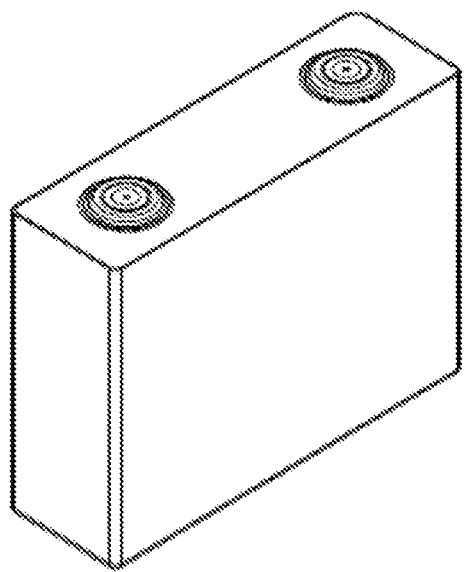
FIG. 10 illustrates a schematic structural diagram of an electrochemical apparatus according to an embodiment of this application.
Figure 11:
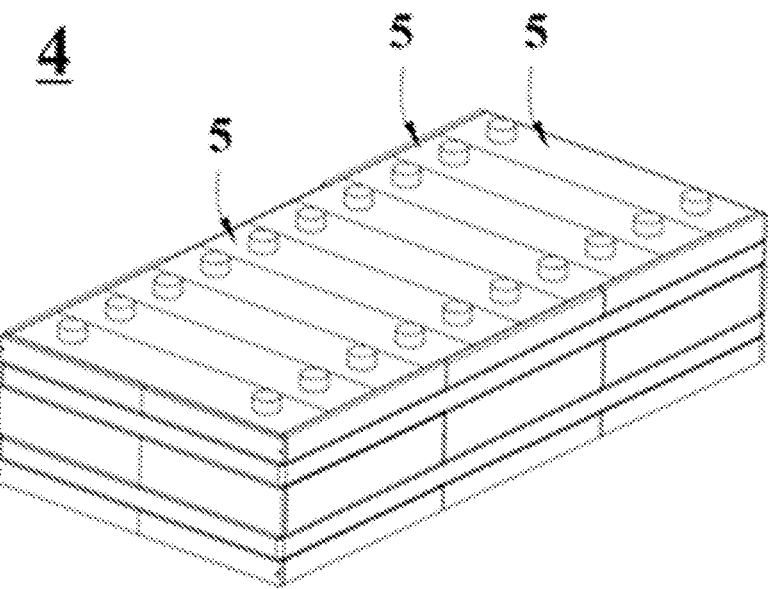
FIG. 11 illustrates a schematic structural diagram of a battery module according to an embodiment of this application.

In some embodiments, referring to FIG. 10 and FIG. 11, in a battery module 4, a plurality of electrochemical apparatuses 5 may be arranged in sequence along a length direction of the battery module 4, or certainly, may be arranged in any other manners. Further, the plurality of electrochemical apparatuses 5 may be secured by using fasteners.

Optionally, the battery module 4 may further include a housing having an accommodating space, and the plurality of electrochemical apparatuses 5 are accommodated in the accommodating space.

Battery Pack

A fifth aspect of the embodiments of this application provides a battery pack, where the battery pack includes any one or more of the battery modules according to the fourth aspect of this application. That is, the battery pack includes any one or more of electrochemical apparatuses according to the third aspect of this application.

A quantity of battery modules in the battery pack may be adjusted based on application and a capacity of the battery pack.

Figure 12:
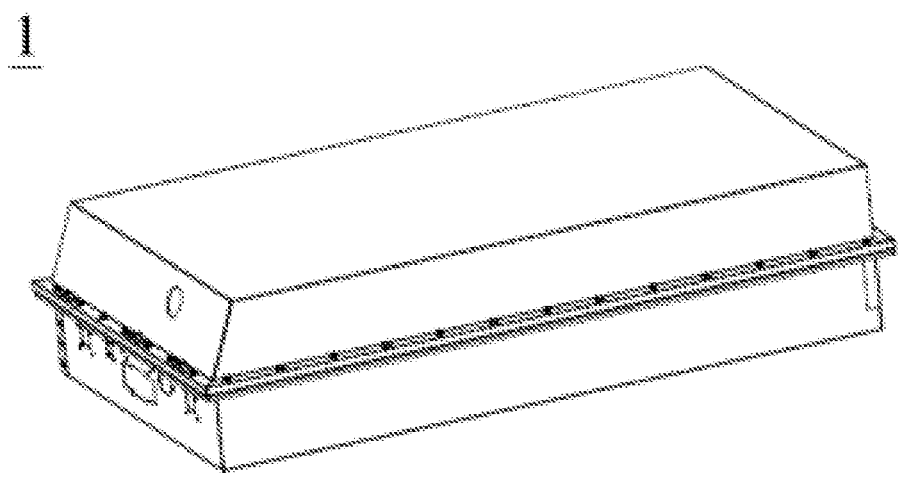
FIG. 12 illustrates a schematic structural diagram of a battery pack according to an embodiment of this application.
Figure 13:
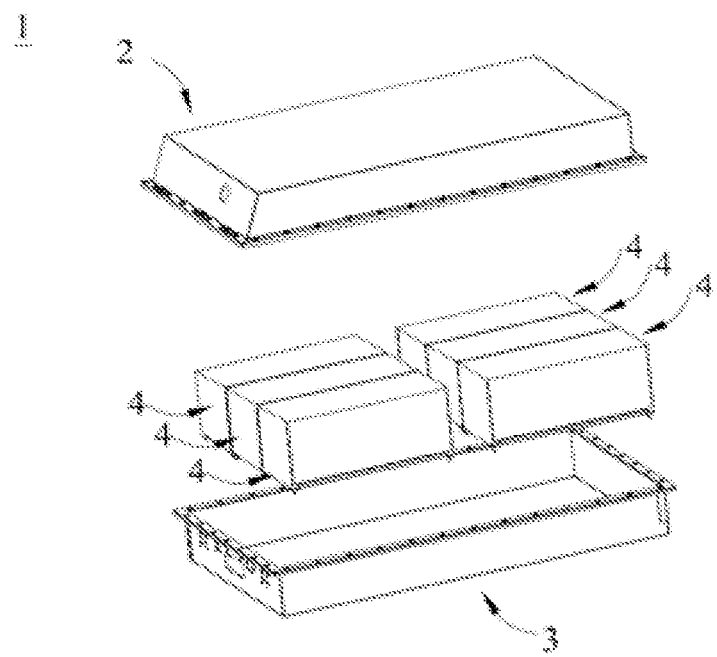
FIG. 13 is an exploded view of FIG. 12.

In some embodiments, referring to FIG. 12 and FIG. 13, the battery pack 1 may include a battery box and a plurality of battery modules 4 disposed in the battery box. The battery box includes an upper case 2 and a lower case 3. The upper case 2 may cover the lower case 3 to form a closed space for accommodating the battery modules 4. The plurality of battery modules 4 may be arranged in the battery box in any manner.

Device

A sixth aspect of the embodiments of this application provides a device, where the device includes any one or more of the electrochemical apparatuses according to the third aspect of this application. The electrochemical apparatus may be used as a power supply for the device.

In some embodiments, the device may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

Figure 14:
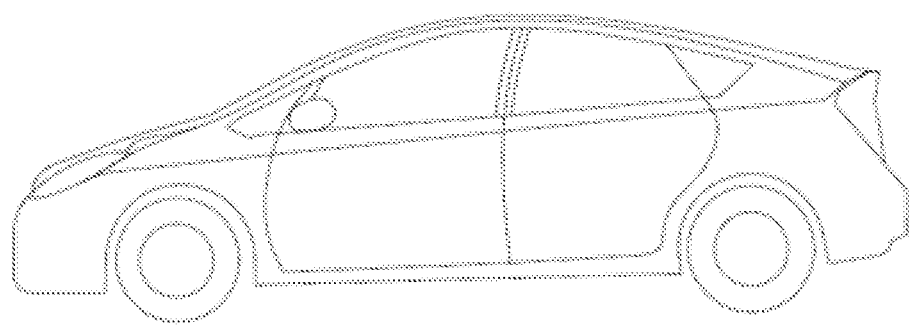
FIG. 14 is a schematic diagram of an implementation of an electrochemical apparatus serving as a power supply of a device.

For example, FIG. 14 illustrates a device including the electrochemical apparatus of this application. The device is a full electric vehicle, a hybrid electric vehicle, a plug-in hybrid electric vehicle, and the like, and the electrochemical apparatus of this application supplies power to the device.

The battery module, the battery pack, and the device in this application include the electrochemical apparatus provided in this application, and therefore have at least the same advantages as the electrochemical apparatus. Details are not described herein again.

Embodiments

Content disclosed in this application is described in more detail in the following embodiments. These embodiments are intended only for illustrative purposes because various modifications and changes made without departing from the scope of the content disclosed in this application are apparent to those skilled in the art. Unless otherwise stated, all parts, percentages, and ratios reported in the following embodiments are based on weights, all reagents used in the embodiments are commercially available or synthesized in a conventional manner, and can be used directly without further processing, and all instruments used in the embodiments are commercially available.

Preparation Method
Preparation of the Negative Current Collector

Select a support layer with a predetermined thickness, perform surface cleaning treatment, place the surface-cleaned support layer in a vacuum plating chamber, melt and evaporate a high-purity copper wire in a metal evaporating chamber at a high temperature of 1300° C. to 2000° C., and process the evaporated metal by using a cooling system in the vacuum plating chamber, to finally obtain a deposition on two surfaces of the support layer to form a conductive layer.

A material, thickness, and density of the metal conductive layer and preparation processing conditions (such as vacuum, atmosphere, humidity, and temperature) can be adjusted, and a material and thickness of the support layer can be adjusted, so as to obtain different T values for the negative current collector.

Preparation of the Negative Electrode Plate

Fully stir and mix a negative electrode active material graphite, conductive carbon black, a thickener sodium carboxymethyl cellulose (CMC), and a binder styrene-butadiene rubber emulsion (SBR) in an appropriate amount of deionized water at a weight ratio of 96.5:1.0:1.0:1.5 to obtain a uniform negative electrode paste, coat the negative electrode paste on the negative current collector, and conduct processes such as drying to obtain the negative electrode plate.

Conventional Negative Current Collector

A copper foil with a thickness of 8 μm.

Preparation of the Conventional Negative Electrode Plate

Different from the negative electrode plate in the foregoing embodiments of this application, a conventional negative current collector is used.

Positive Current Collector

An aluminum foil with a thickness of 12 μm.

Preparation of the Positive Electrode Plate

Fully stir and mix a positive electrode active material $LiNi_{1/3}Co_{1/3}Mn_{1/3}O_2$ (NCM333), conductive carbon black, and polyvinylidene fluoride (PVDF) in an appropriate amount of N-methylpyrrolidone (NMP) solvent at a weight ratio of 93:2:5 to obtain a uniform positive electrode paste, coat the positive electrode paste on the positive current collector, and conduct processes such as drying to obtain the positive electrode plate.

Preparation of the Electrolyte

Evenly mix ethylene carbonate (EC) and ethyl methyl carbonate (EMC) at a volume ratio of 3:7 to obtain an organic solvent, and then evenly dissolve 1 mol/L $LiPF_6$ in the organic solvent.

Preparation of the Lithium-Ion Secondary Battery

Laminate the positive electrode plate, the separator (PP/PE/PP composite film), and the negative electrode plate in sequence, wind them into a battery core, pack the battery core into a packing housing, inject the electrolyte into the battery core, and conduct processes such as sealing, waiting, hot pressing, cold pressing, and formation, to obtain the lithium-ion secondary battery.

Test Content

1. Conduct testing on the negative current collector by using the test method described above.
2. Battery performance testing (1) Cyclic Performance Test At 45° C., charge the lithium-ion secondary battery to 4.2V at a constant current rate of 1 C, charge the battery to a current less than or equal to 0.05 C at a constant voltage, and then discharge the battery to 2.8V at a constant current rate of 1 C. This is a charge and discharge cycle, and a discharge capacity this time is a discharge capacity of the first cycle. The battery is charged and discharged for 1000 cycles by using the foregoing method, and a discharge capacity of the 1000th cycles is recorded.

Capacity retention rate (%) of the lithium-ion secondary battery after 1000 cycles at 45° C. and 1 C/1 C=Discharge capacity of the 1000th cycle/Discharge capacity of the 1st cycler 100%

(2) Rate Performance Test

At 25° C., charge the lithium-ion secondary battery to 4.2V at a constant current rate of 1 C, charge the battery to a current less than or equal to 0.05 C at a constant voltage, and then discharge the battery to 3.0V at a constant current rate of 1 C, to obtain a 1 C-rate discharge capacity of the lithium-ion secondary battery.

At 25° C., charge the lithium-ion secondary battery to 4.2V at a constant current rate of 1 C, charge the battery to a current less than or equal to 0.05 C at a constant voltage, and then discharge the battery to 3.0V at a constant current rate of 4 C, to obtain a 4 C-rate discharge capacity of the lithium-ion secondary battery.

4C-rate capacity retention rate (%) of the lithium-ion secondary battery=4C-rate discharge capacity/1C-rate discharge capacity×100%

Test Result

1. Role of the Negative Current Collector of this Application in Improving the Weight Energy Density of the Electrochemical Apparatus

TABLE 1

| Serial number | Support layer Material | $D_2$ (μm) | Metal conductive layer Material | $D_1$ (μm) | Thickness of the negative current collector (μm) | Weight percent composition of the negative current collector (%) |
|---|---|---|---|---|---|---|
| Negative current collector 1 | PET | 5 | Cu | 0.3 | 5.6 | 16 |
| Negative current collector 2 | PET | 5 | Cu | 0.5 | 6 | 21.6 |

TABLE 1-continued

| Serial number | Support layer Material | D$_2$ (μm) | Metal conductive layer Material | D$_1$ (μm) | Thickness of the negative current collector (μm) | Weight percent composition of the negative current collector (%) |
|---|---|---|---|---|---|---|
| Negative current collector 3 | PET | 5 | Cu | 0.6 | 6.2 | 24.1 |
| Negative current collector 4 | PI | 2 | Cu | 0.8 | 3.6 | 23.8 |
| Negative current collector 5 | PET | 8 | Cu | 1 | 10 | 39.6 |
| Negative current collector 6 | PET | 6 | Cu | 1.5 | 9 | 48.5 |
| Negative current collector 7 | PET | 4 | Cu | 1.2 | 6.4 | 37.3 |
| Negative current collector 8 | PET | 10 | Cu | 0.2 | 10.4 | 23.3 |
| Negative current collector 9 | PI | 8 | Cu | 2 | 12 | 65.3 |
| Conventional negative current collector | / | / | Cu | / | 8 | 100 |

In Table 1, the weight percent composition of the negative current collector refers to a percentage obtained by dividing the weight of the negative current collector per unit area by the weight of the conventional negative current collector per unit area.

Compared with the conventional copper-foil negative current collector, the weights of the negative current collectors in the embodiments of this application are all reduced at different degrees, thereby improving the weight energy density of the battery.

2. Electrical Performance of the Negative Current Collector of this Application

TABLE 2

| Serial number | Metal conductive layer Material | D$_1$ (μm) | Density (g/cm$^3$) | Volume resistivity (Ω·m) | Support layer Material | E (GPa) | T (%) |
|---|---|---|---|---|---|---|---|
| Negative current collector 10 | Cu | 0.3 | 8.00 | 3.28 × 10$^{-8}$ | PET | 4.1 | 5.0 |
| Negative current collector 11 | Cu | 0.3 | 8.30 | 2.77 × 10$^{-8}$ | PET | 4.1 | 3.7 |
| Negative current collector 12 | Cu | 0.5 | 8.42 | 2.58 × 10$^{-8}$ | PET | 4.1 | 3.2 |
| Negative current collector 13 | Cu | 0.7 | 8.48 | 2.46 × 10$^{-8}$ | PET | 4.1 | 2.9 |
| Negative current collector 14 | Cu | 0.8 | 8.52 | 2.34 × 10$^{-8}$ | PET | 4.1 | 2.5 |
| Negative current collector 15 | Cu | 0.9 | 8.25 | 2.83 × 10$^{-8}$ | PET | 4.1 | 4.0 |
| Negative current collector 16 | Cu | 0.9 | 8.36 | 2.68 × 10$^{-8}$ | PPS | 4.0 | 3.4 |
| Negative current collector 17 | Cu | 0.9 | 8.60 | 2.13 × 10$^{-8}$ | PEN | 5.1 | 2.0 |
| Negative current collector 18 | Cu | 0.9 | 8.72 | 2.10 × 10$^{-8}$ | PI | 1.9 | 1.4 |
| Negative current collector 19 | Cu | 0.9 | 8.80 | 2.06 × 10$^{-8}$ | PP | 2.2 | 1.0 |
| Negative current collector 20 | Cu | 1.0 | 8.20 | 3.22 × 10$^{-8}$ | PET | 4.1 | 4.2 |
| Negative current collector 21 | Cu | 1.2 | 8.40 | 2.62 × 10$^{-8}$ | PET | 4.1 | 3.6 |
| Negative current collector 22 | Cu | 1.5 | 8.84 | 1.98 × 10$^{-8}$ | PET | 4.1 | 0.8 |
| Negative current collector 23 | Cu | 2.0 | 8.95 | 1.76 × 10$^{-8}$ | PET | 4.1 | 0.2 |
| Negative current collector 24 | Copper alloy | 1.0 | 8.88 | 1.82 × 10$^{-8}$ | PET | 4.1 | 0.5 |
| Comparison negative current collector | Cu | 1.0 | 7.18 | 5.22 × 10$^{-8}$ | PET | 4.1 | 8.3 |

In Table 2, the copper alloy is composed of 95 wt % copper and 5 wt % nickel.

The volume resistivity of the support layer is $2.1 \times 10^{14}$ Ω·m, and the thickness $D_2$ of the support layer is 8 μm.

When the metal conductive layer and the support layer are the same in material and thickness, negative current collectors with different T values can be obtained by adjusting preparation conditions of the metal conductive layer.

An overcurrent test is conducted on the positive current collectors in Table 2. The overcurrent test method includes: cutting the negative current collector to a width of 100 mm, coating a negative electrode active material layer 80 mm wide in the middle of the width direction and perform rolling to form a negative electrode plate, and cutting the electrode plate obtained by rolling into strips of 100 mm×30 mm in the width direction, with 10 pieces for each electrode plate. During testing, non-coated conductive areas on both sides of the electrode plate sample are connected to positive and negative terminals of a charge and discharge machine, and then the charge and discharge machine is set to allow a 5 A current to pass through the electrode plate for 1 h. The test is successful if the electrode plate does not blow; otherwise, the test fails. 10 samples in each sample set were tested, and the test results are shown in Table 3 below.

TABLE 3

| Number of negative electrode plate | Number of negative current collector | Overcurrent test pass rate (%) |
| --- | --- | --- |
| Negative electrode plate 10 | Negative current collector 10 | 60 |
| Negative electrode plate 11 | Negative current collector 11 | 80 |
| Negative electrode plate 12 | Negative current collector 12 | 90 |
| Negative electrode plate 13 | Negative current collector 13 | 90 |
| Negative electrode plate 14 | Negative current collector 14 | 100 |
| Negative electrode plate 15 | Negative current collector 15 | 70 |
| Negative electrode plate 16 | Negative current collector 16 | 90 |
| Negative electrode plate 17 | Negative current collector 17 | 100 |
| Negative electrode plate 18 | Negative current collector 18 | 100 |
| Negative electrode plate 19 | Negative current collector 19 | 100 |
| Negative electrode plate 20 | Negative current collector 20 | 70 |
| Negative electrode plate 21 | Negative current collector 21 | 80 |
| Negative electrode plate 22 | Negative current collector 22 | 100 |
| Negative electrode plate 23 | Negative current collector 23 | 100 |
| Negative electrode plate 24 | Negative current collector 23 | 100 |
| Comparison negative electrode plate | Comparison negative current collector | 20 |

It can be seen from Table 2 and Table 3 that when the tensile strain of the negative current collector is 2.5%, the sheet resistance growth rate T of the metal conductive layer is not greater than 5%. In this case, the negative current collector has better electrical performance. The negative electrode plate using the negative current collector has better overcurrent performance after undergoing rolling. Otherwise, the negative current collector has poor conductivity performance, with little practical value for battery products. In some embodiments, when the tensile strain of the negative current collector is 2.5%, the sheet resistance growth rate T of the metal conductive layer satisfies T≤2.5%. More preferably, T≤1%.

3. Impact of the Protective Layer on Electrochemical Performance of the Electrochemical Apparatus

TABLE 4

| Number of negative current collector | Upper protective layer | | Lower protective layer | |
| --- | --- | --- | --- | --- |
| | Material | $D_a$ (nm) | Material | $D_b$ (nm) |
| Negative current collector 6-1 | / | / | Nickel | 1 |
| Negative current collector 6-2 | / | / | Nickel | 10 |
| Negative current collector 6-3 | / | / | Nickel-based alloy | 50 |
| Negative current collector 6-4 | / | / | Nickel | 150 |
| Negative current collector 6-5 | Nickel | 5 | / | / |
| Negative current collector 6-6 | Nickel-based alloy | 100 | / | / |
| Negative current collector 6-7 | Nickel | 10 | Nickel | 5 |
| Negative current collector 6-8 | Nickel | 10 | Nickel | 10 |
| Negative current collector 6-9 | Nickel | 50 | Nickel | 50 |
| Negative current collector 6-10 | Nickel | 100 | Nickel | 50 |
| Negative current collector 6-11 | Nickel | 150 | Nickel | 75 |
| Negative current collector 6-12 | Nickel oxide | 100 | Nickel oxide | 50 |
| Negative current collector 6-13 | Nickel oxide | 100 | Nickel | 50 |
| Negative current collector 6-14 | Dual-layer protective layer | 50 | Nickel | 50 |

For the negative current collectors in Table 4, a protective layer is disposed on a basis of the negative current collector 6 in Table 1.

The nickel-based alloy contains 90 wt % nickel and 10 wt % chromium.

The dual-layer protective layer includes a nickel protective layer with a thickness of 25 nm disposed on a surface of the metal conductive layer facing away from the support layer, and a nickel oxide protective layer with a thickness of 25 nm disposed on a surface of the nickel protective layer facing away from the support layer.

TABLE 5

| Number of battery | Number of negative current collector | Capacity retention rate after 1000 cycles at 45° C. and 1C/1C (%) | 4C rate capacity retention rate (%) |
| --- | --- | --- | --- |
| Battery 1 | Negative current collector 6 | 86.3 | 46.8 |
| Battery 2 | Negative current collector 6-1 | 86.3 | 46.5 |
| Battery 3 | Negative current collector 6-2 | 86.7 | 46.6 |
| Battery 4 | Negative current collector 6-3 | 86.5 | 46.0 |
| Battery 5 | Negative current collector 6-4 | 87.1 | 47.4 |
| Battery 6 | Negative current collector 6-5 | 86.5 | 46.4 |
| Battery 7 | Negative current collector 6-6 | 86.7 | 46.1 |
| Battery 8 | Negative current collector 6-7 | 87.2 | 47.3 |
| Battery 9 | Negative current collector 6-8 | 87.6 | 47.5 |
| Battery 10 | Negative current collector 6-9 | 87.8 | 47.7 |

TABLE 5-continued

| Number of battery | Number of negative current collector | Capacity retention rate after 1000 cycles at 45° C. and 1C/1C (%) | 4C rate capacity retention rate (%) |
|---|---|---|---|
| Battery 11 | Negative current collector 6-10 | 88.0 | 48.1 |
| Battery 12 | Negative current collector 6-11 | 88.3 | 48.6 |
| Battery 13 | Negative current collector 6-12 | 87.3 | 46.2 |
| Battery 14 | Negative current collector 6-13 | 86.9 | 48.3 |
| Battery 15 | Negative current collector 6-14 | 87.9 | 47.7 |
| Battery 16 | Conventional negative current collector | 86.7 | 47.9 |

It can be seen from Table 5 that the battery using the negative current collector in the embodiments of this application has a good cycle life and good rate performance, equivalent to the cycle performance and rate performance of the battery using the conventional negative current collector. This indicates that use of the negative current collector in the embodiments of this application do not have obviously adverse effect on electrochemical performance of the negative electrode plate and the battery. Especially for the battery made of the negative current collector provided with the protective layer, the capacity retention rate after 1000 cycles at 45° C. and 1 C/1 C and the 4 C-rate capacity retention rate are further improved, indicating better battery reliability.

The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A negative current collector, comprising:
   a support layer, wherein the support layer has at least two sublayers stacked in a thickness direction, the at least two sublayers comprise different polymer materials;
   a metal conductive layer disposed on at least one of two opposite surfaces of the support layer in the thickness direction of the support layer; and
   an upper protective layer comprising:
      a first upper protective layer disposed on a surface of the metal conductive layer facing away from the support layer, the first upper protective layer comprising metal; and
      a second upper protective layer disposed on a surface of the first upper protective layer facing away from the support layer, the second upper protective layer comprising metal oxide,
   wherein:
   a density of the support layer is less than a density of the metal conductive layer;
   the density of the metal conductive layer is 8.0 g/cm3 to 8.96 g/cm3;
   a thickness D1 of the metal conductive layer is 300 nm≤D1≤2 µm;
   a thickness Da of the upper protective layer is 100 nm<Da≤200 nm; and
   when a tensile strain of the negative current collector is 2.5%, a sheet resistance growth rate T of the metal conductive layer is T≤5%.

2. The negative current collector according to claim 1, wherein a volume resistivity of the metal conductive layer is 1.3×10−8 Ω·m to 3.3×10−8 Ω·m.

3. The negative current collector according to claim 1, wherein a material of the metal conductive layer is selected from the group consisting of copper, copper alloy, nickel, nickel alloy, titanium, silver, and any combinations thereof.

4. The negative current collector according to claim 1, further comprising a lower protective layer, wherein the lower protective layer is disposed on a surface of the metal conductive layer facing the support layer in a thickness direction of the metal conductive layer; and
   the lower protective layer comprises one or more selected from the group consisting of nickel, chromium, nickel-based alloy, copper-based alloy, aluminum oxide, cobalt oxide, chromium oxide, nickel oxide, graphite, superconducting carbon, acetylene black, carbon black, Ketjen black, carbon dots, carbon nanotube, graphene, and carbon nanofiber.

5. The negative current collector according to claim 4, wherein a thickness Db of the lower protective layer is 1 nm≤Db≤200 nm and Da and Db meet 0.5 Da≤Db≤0.8 Da.

6. The negative current collector according to claim 1, wherein a thickness D2 of the support layer is 1 µm≤D2≤20 µm; and
   the polymer materials are selected from the group consisting of polyamide, polyimide, polyethylene terephthalate, polybutylene terephthalate, polyethylene naphthalate, polycarbonate, polyethylene, polypropylene, poly(p-phenylene ether), acrylonitrile-butadiene-styrene copolymer, polyvinyl alcohol, polystyrene, polyvinyl chloride, polyvinylidene fluoride, polytetrafluoroethylene, sodium polystyrene sulfonate, polyacetylene, silicone rubber, polyformaldehyde, polyphenylene oxide, polyphenylene sulfone, polyethylene glycol, polysulfur nitride polymer material, polyphenyl, polypyrrole, polyaniline, polythiophene, polypyridine, cellulose, starch, protein, epoxy resin, phenol-formaldehyde resin, a derivative of the foregoing materials, a crosslinked product of the foregoing materials, a copolymer of the foregoing materials, and any combinations thereof.

7. The negative current collector according to claim 1, wherein an elongation at break of the support layer is greater than or equal to an elongation at break of the metal conductive layer; and
   a Young's modulus E of the support layer is E≥1.9 GPa.

8. The negative current collector according to claim 1, wherein the metal conductive layer is a vapor deposition layer or an electroplating layer.

9. An electrochemical apparatus, comprising a positive electrode plate, a negative electrode plate, a separator separating the positive electrode plate from the negative electrode plate, and an electrolyte, wherein the negative electrode plate comprises:
   a negative current collector; and
   a negative electrode active material layer disposed on the negative current collector, wherein the negative current collector comprises:
      a support layer, wherein the support layer has at least two sublayers stacked in a thickness direction, the at least two sublayers comprise different polymer materials;
      a metal conductive layer disposed on at least one of two opposite surfaces of the support layer in the thickness direction of the support layer; and an upper protective layer comprising:
a first upper protective layer disposed on a surface of the metal conductive layer facing away from the support layer, the first upper protective layer comprising metal; and
a second upper protective layer disposed on a surface of the first upper protective layer facing away from the support layer, the second upper protective layer comprising metal oxide, wherein:

a density of the support layer is less than a density of the metal conductive layer;

the density of the metal conductive layer is 8.0 g/cm3 to 8.96 g/cm3;

a thickness D1 of the metal conductive layer is 300 nm≤D1≤2 μm;

a thickness Da of the upper protective layer is 100 nm<Da≤200 nm; and when a tensile strain of the negative current collector is 2.5%, a sheet resistance growth rate T of the metal conductive layer is T≤5%.

10. The electrochemical apparatus according to claim 9, wherein a volume resistivity of the metal conductive layer is 1.3×10−8 Ω·m to 3.3×10−8 Ω·m.

11. The electrochemical apparatus according to claim 9, wherein a material of the metal conductive layer is selected from the group consisting of copper, copper alloy, nickel, nickel alloy, titanium, silver, and any combinations thereof.

12. The electrochemical apparatus according to claim 9, wherein the negative current collector further comprises a lower protective layer, wherein the lower protective layer is disposed on a surface of the metal conductive layer facing the support layer in a thickness direction of the metal conductive layer; and the lower protective layer comprises one or more selected from the group consisting of nickel, chromium, nickel-based alloy, copper-based alloy, aluminum oxide, cobalt oxide, chromium oxide, nickel oxide, graphite, superconducting carbon, acetylene black, carbon black, Ketjen black, carbon dots, carbon nanotube, graphene, carbon nanofiber, and any combinations thereof.

13. The electrochemical apparatus according to claim 12, wherein a thickness Db of the lower protective layer is 1 nm≤Db≤200 nm, and Da and Db meet 0.5 Da≤Db≤0.8 Da.

14. The electrochemical apparatus according to claim 9, wherein a thickness D2 of the support layer is 1 μm≤D2≤20 μm;

the polymer materials are selected from the group consisting of polyamide, polyimide, polyethylene terephthalate, polybutylene terephthalate, polyethylene naphthalate, polycarbonate, polyethylene, polypropylene, poly(p-phenylene ether), acrylonitrile-butadiene-styrene copolymer, polyvinyl alcohol, polystyrene, polyvinyl chloride, polyvinylidene fluoride, polytetrafluoroethylene, sodium polystyrene sulfonate, polyacetylene, silicone rubber, polyformaldehyde, polyphenylene oxide, polyphenylene sulfone, polyethylene glycol, polysulfur nitride polymer material, polyphenyl, polypyrrole, polyaniline, polythiophene, polypyridine, cellulose, starch, protein, epoxy resin, phenol-formaldehyde resin, a derivative of the foregoing materials, a crosslinked product of the foregoing materials, a copolymer of the foregoing materials, and any combinations thereof.

15. The electrochemical apparatus according to claim 9, wherein an elongation at break of the support layer is greater than or equal to an elongation at break of the metal conductive layer; and a Young's modulus E of the support layer is E≥1.9 GPa.

16. The electrochemical apparatus according to claim 9, wherein the metal conductive layer is a vapor deposition layer or an electroplating layer.

17. A device, comprising an electrochemical apparatus, wherein the electrochemical apparatus serves as a power supply of the device and the electrochemical apparatus further comprises a positive electrode plate, a negative electrode plate, a separator separating the positive electrode plate from the negative electrode plate, and an electrolyte, wherein the negative electrode plate comprises:

a negative current collector; and a negative electrode active material layer disposed on the negative current collector, wherein the negative current collector comprises:

a support layer, wherein the support layer has at least two sublayers stacked in a thickness direction, the at least two sublayers comprise different polymer materials;

a metal conductive layer disposed on at least one of two opposite surfaces of the support layer in the thickness direction of the support layer; and an upper protective layer comprising:

a first upper protective layer disposed on a surface of the metal conductive layer facing away from the support layer, the first upper protective layer comprising metal; and a second upper protective layer disposed on a surface of the first upper protective layer facing away from the support layer, the second upper protective layer comprising metal oxide, wherein:

a density of the support layer is less than a density of the metal conductive layer;

the density of the metal conductive layer is 8.0 g/cm3 to 8.96 g/cm3;

a thickness D1 of the metal conductive layer is 300 nm≤D1≤2 μm;

a thickness Da of the upper protective layer is 100 nm<Da≤200 nm; and when a tensile strain of the negative current collector is 2.5%, a sheet resistance growth rate T of the metal conductive layer is T≤5%.

18. The device according to claim 17, wherein the device is one selected from the group consisting of a mobile device, an electric vehicle, an electric train, a satellite, a ship, and an energy storage system.

19. The negative current collector according to claim 3, wherein the material of the metal conductive layer is copper or copper alloy, and a weight percent composition of a copper element in the copper alloy is more than 90%.

20. The negative current collector according to claim 1, wherein the polymer materials of the sublayers are insulating polymer materials.

* * * * *